Sept. 11, 1945.  R. H. SULLWOLD  2,384,706
HYDRAULIC SYSTEM
Filed Aug. 2, 1944  2 Sheets-Sheet 1

INVENTOR.
Richard H. Sullwold
BY
Lynn y Latta
Attorney

Sept. 11, 1945.　　R. H. SULLWOLD　　2,384,706
HYDRAULIC SYSTEM
Filed Aug. 2, 1944　　2 Sheets-Sheet 2

INVENTOR.
Richard H. Sullwold
BY
Attorney

Patented Sept. 11, 1945

2,384,706

UNITED STATES PATENT OFFICE 2,384,706

HYDRAULIC SYSTEM

Richard H. Sullwold, Los Angeles, Calif., assignor to North American Aviation, Inc.

Application August 2, 1944, Serial No. 547,801

5 Claims. (Cl. 244—111)

This invention relates to hydraulic brake lines for aircraft landing gear and has as its object to provide a hydraulic brake line which does not require the use of flexible tubing.

Practically all aircraft landing gear is designed to fold, in one manner or another, to a position lying within the streamlined air flow surface of either the fuselage or the wing portions of the airplane. Where hydraulic brakes are employed, it is necessary to provide some type of flexible connection in the brake line that will permit of the necessary folding movement. It is also customary to provide a yieldable cushioning connection between the wheel and the strut portion of the landing gear to absorb landing and taxiing shocks. The conventional hydraulic shock absorber provided for this purpose involves a considerable amount of telescoping movement in the strut, and it is necessary to provide for a corresponding amount of longitudinal yielding movement in the hydraulic brake line. It has previously been customary to employ a flexible tube connection between the brake mechanism and that portion of the brake line which parallels the strut, in order to accommodate the telescoping action of the strut and it has also been the practice in some instances to employ a swivel connection in the hydraulic brake line to accommodate the folding movement of the strut. The object of the present invention is to provide a single "knee action" connection between that portion of the hydraulic brake line which parallels the strut and the feed line leading from the source of pressure to the strut, which is adapted to serve the dual function of accommodating both the telescoping movement and the folding movement of the strut, and to thereby completely eliminate all flexible tubing in this portion of the hydraulic system.

Figure 1:
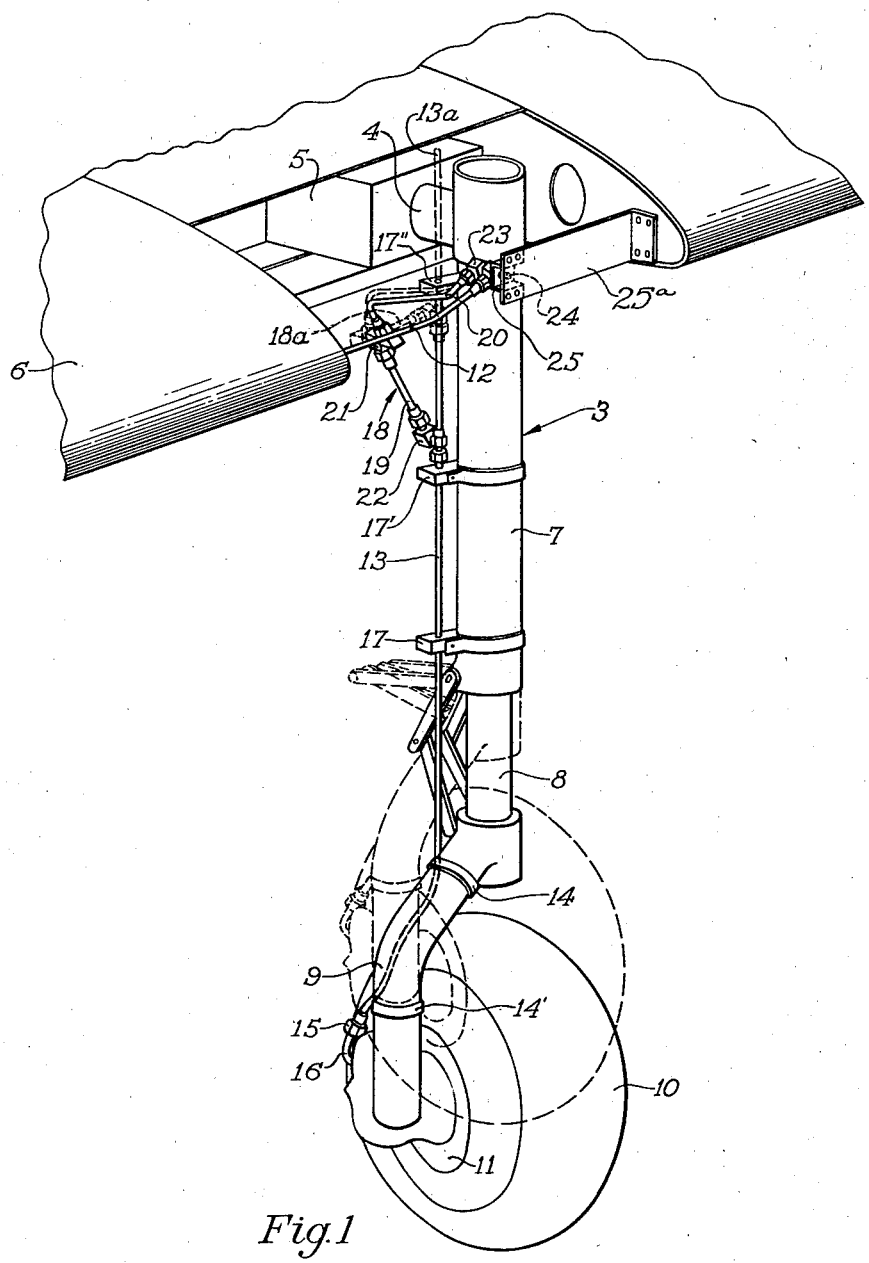
Figure 2:
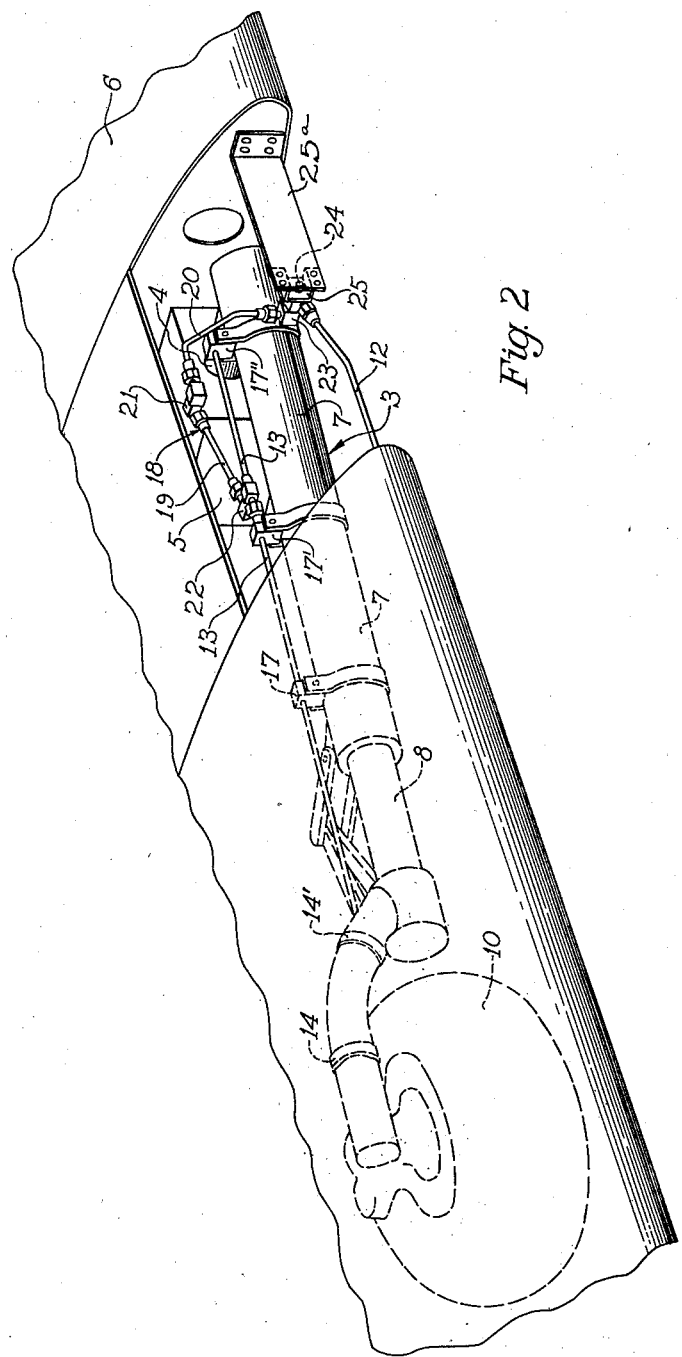

As an example of one form of construction in which the invention may be embodied, reference is made to the appended drawings, wherein:

Fig. 1 is a perspective view of a portion of the wing structure of an airplane with landing gear mechanism, incorporating the invention, shown in the lowered position; and Fig. 2 is a perspective view of the same wing structure with the landing gear shown in the raised position.

The particular landing gear structure shown in the embodiment of the invention which I have chosen for illustrative purposes, is that of the well-known "Mustang" or P-51 fighter airplane, in which the oleo strut, designated generally by means of which it is journalled in a bearing 5 mounted in the wing structure 6 of the airplane in such a manner that the landing gear may fold, in a plane that is generally transverse to the longitudinal axis of the airplane, from the extended position shown in Fig. 1 to the retracted position of Fig. 2.

The strut 3 embodies a cylinder 7 to the upper end of which the trunnion 4 is affixed, and a piston 8 telescoping in the cylinder 7 and having fixed to its lower end an elbowed arm 9, on the lower end of which is journalled the landing wheel 10. An external portion of the brake mechanism is indicated at 11.

Fluid under pressure for operating the brake mechanism 11 is transmitted from a feed line 12 extending through the wing section to a tube 13 paralleling the strut. The lower end of the tube 13 is secured to the arm 9 as by means of bands 14, 14' and is connected through a union 15 to a short brake tube 16 leading into the brake mechanism.

The tube 13 moves with the piston 8 and is slidably mounted relative to the outer cylinder 7 through the medium of bearings 17, 17', 17", each having a bore through which the tube slides.

The tube 13 is joined to the fluid supply line 12 through a "knee action" connection indicated generally at 18. The connection 18 (Fig. 2) includes two short lengths of tubing 19, 20, which are joined by a "knee" swivel 21. The tube section 19 is joined to the tube 13 by a swivel coupling 22 and the tube section 20 is joined to the supply line 12 by a swivel coupling 23. The axes of swiveling movement of the couplings 21 and 23 are parallel to each other and to the pivot axis of the trunnion 4. One member of the coupling 23 is pivoted (at 24) to a yoke 25 which is carried by a bracket 25a secured to the wing structure 6. The yoke 25 thus forms a supporting terminal for the tube 12 and provides a fixed axis about which the coupling 23 may pivot.

In the operation of the landing gear, telescoping movement of the piston 8 in the cylinder 7 is accompanied by sliding movement of the tube 13 in the bearings 17, 17' and 17", the upper end of the tube 13 having a maximum possible upward movement through the bearing 17" to a position indicated by the dotted lines at 13a. Such movement is accommodated by "knee action" in the connection 18 to the position indicated in dotted lines at 18a.

When the landing gear swings to the retracted position, the tube section 20 will hinge about the swivel coupling 23 and the bracket 25, accompanied by a slight "knee action" in the connection 18 to accommodate the displacement existing between the axis of the pivot 24 and that of the trunnion 4.

The foregoing may be taken as illustrative of one form in which the invention may be embodied, it being our intention to cover in our claims the use of any equivalent arrangement or apparatus.

I claim as my invention:

1. A hydraulic brake line for an airplane landing gear of the type including telescoping oleo strut members the upper of which is pivoted to the frame of the airplane for folding movement to retract the gear, and the lower of which mounts a landing wheel having hydraulic brake mechanism associated therewith; said brake line comprising a brake tube communicating with said brake mechanism and arranged for movement with said lower strut member, a supply line carried by said frame, a pair of folding tube sections, and swivel couplings joining said tube sections respectively to said brake tube, to said supply line, and to each other.

2. A brake line as defined in claim 1, wherein the axes of said swivel couplings are parallel to that of the pivot joining said upper strut member to the frame.

3. A brake line as defined in claim 1, wherein the axis of the swivel coupling joining said tube sections is parallel to and near the axis of the pivot joining said upper strut member to the frame.

4. A brake line as defined in claim 1, including bearing means carried by said upper strut member, in which said brake tube is mounted for longitudinal sliding movement.

5. A hydraulic brake line for an airplane landing gear of the type including telescoping oleo strut members the upper of which is pivoted to the frame of the airplane for folding movement to retract the gear, and the lower of which mounts a landing wheel having hydraulic brake mechanism associated therewith, said brake line comprising a supply line, a brake tube the lower end of which is coupled to said brake mechanism, bearing means carried by said upper strut member, in which said brake tube is mounted for longitudinal sliding movement, and articulated coupling means joining the upper end of said brake tube to said supply line and adapted to permit longitudinal movement of said brake tube transversely of said supply line and folding movement of said brake tube relative to said supply line to conform to the folding movement of said gear.

RICHARD H. SULLWOLD.